Oct. 8, 1957  C. H. MUELLER  2,808,779
INJECTOR
Filed June 17, 1953
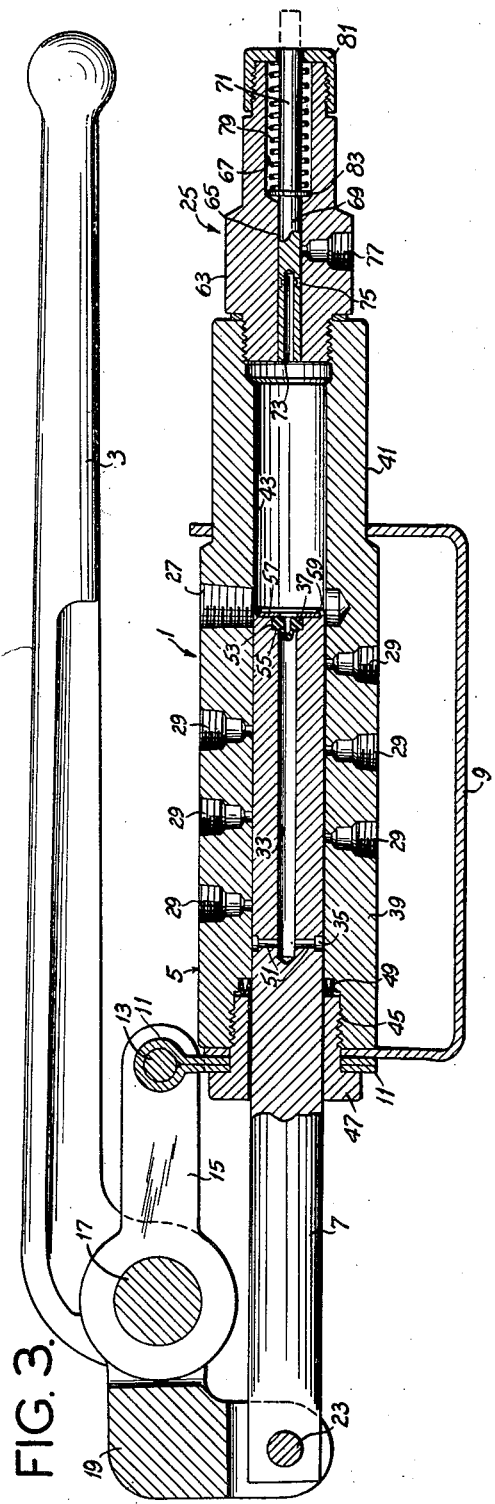
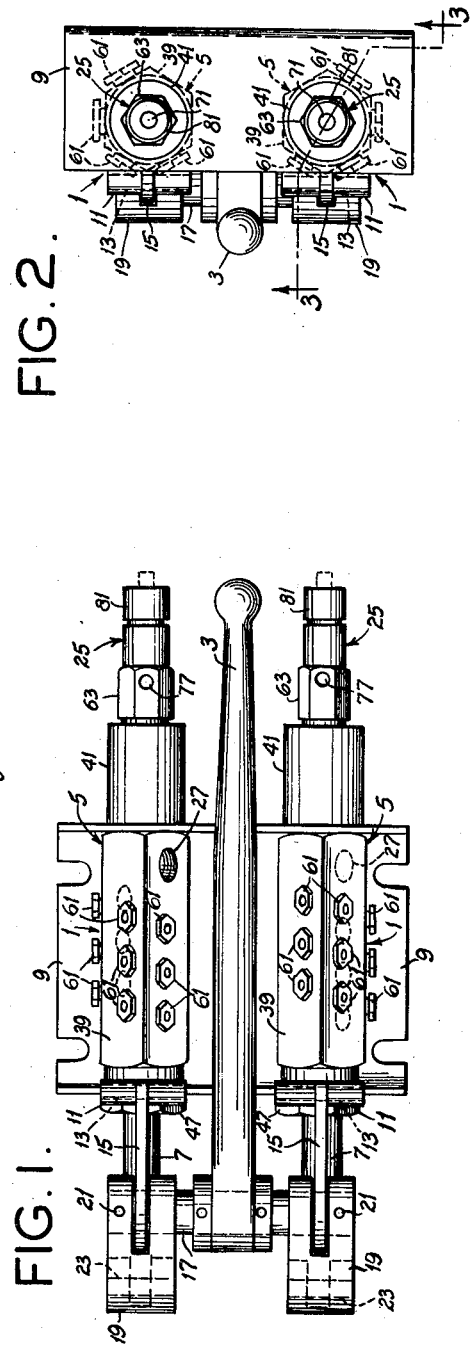
Carl H. Mueller,
Inventor.
Koenig and Pope,
Attorneys.

2,808,779
Patented Oct. 8, 1957

2,808,779

INJECTOR

Carl H. Mueller, St. Louis, Mo., assignor to The McNeil Machine & Engineering Company, Akron, Ohio, a corporation of Ohio Application June 17, 1953, Serial No. 362,252

3 Claims. (Cl. 103—2)

This invention relates to injectors, and more particularly to lubricant injectors.

The invention involves an improvement upon the injectors shown in the two coassigned, copending applications of Victor G. Klein and myself, both entitled Injector, Serial No. 240,382, filed August 4, 1951, issued as Patent No. 2,686,476, August 17, 1954, and Serial No. 255,828, filed November 10, 1951, issued as Patent No. 2,783,713, March 5, 1957, and in the coassigned, copending application of Lutwin C. Rotter, entitled Injector, Serial No. 255,863, filed November 10, 1951, issued as Patent No. 2,694,977, November 23, 1954. Among the several objects of the invention may be noted the provision of a multiple-outlet injector, and particularly a lubricant injector of the same general type as disclosed in said copending applications, for delivering measured charges of lubricant individually to a plurality of points of lubrication upon a single cycle of operation, having means for preventing development of unduly high pressure in any of the injector outlets. The invention is particularly applicable in cases where the injector is installed for delivering charges of lubricant to bearings having seals of a type which are apt to be destroyed if lubricant is applied to the bearings under excessive pressure. It provides for by-passing the outlet to any bearing that does not need lubricant, thereby avoiding application to the bearing of lubricant under excessive pressure, and preventing destruction of the bearing seal. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 is a plan of a typical installation of two injectors of this invention for simultaneous manual operation;

Fig. 2 is an end view of Fig. 1; and,

Fig. 3 is a longitudinal cross section of one injector, taken generally on line 3—3 of Fig. 2.

Corresponding reference characters indicate corresponding parts throughout the several views of the drawings.

Referring to the drawings, there is shown a typical installation wherein two injectors 1 of this invention are mounted side-by-side for simultaneous manual operation by a single hand lever 3. Each injector 1 comprises a cylinder 5, with a plunger 7 movable in the cylinder. The injectors are mounted side-by-side in a U-shaped bracket 9. Associated with each injector is a hinge member 11 holding a pin 13. Links 15 are pivotally mounted at one end by the pins 13. A cross-shaft 17 is rotary in the other end of the links 15. The hand lever 3 is fixed at one end to the shaft 17 centrally between the links 15. Arms 19 are fixed at one end to the shaft as indicated at 21 and are pin-connected at their other end to the outer ends of plungers 7, as indicated at 23. The arrangement is such that by swinging the lever 3 away from its Fig. 3 retracted position, both plungers 7 are driven forward into the respective cylinders 5, and when the lever is swung back, the plungers are pulled out.

The injectors 1 are identical. As above stated, each comprises a cylinder 5 with a plunger 7 movable therein. At the forward end of the cylinder 5 (its right end as shown in the drawings) is a special by-pass or vent valve 25 of this invention, to be more particularly described later. The cylinder has a lateral inlet port 27 toward its forward end, and a series of longitudinally spaced lateral outlet ports 29 between its rearward end and the inlet port. The plunger is made hollow for some distance from its forward end to provide a longitudinal passage 33 for communication from the space in the cylinder forward of the plunger to a lateral port 35 in the plunger spaced from its forward end. The length of the passage 33 is greater than the longitudinal extent of the series of outlet ports 29. In the passage is a check valve 37 which is adapted to open under relatively low pressure upon forward movement of the plunger and to remain closed upon rearward movement of the plunger. The plunger is movable from the rearward charging position illustrated in Fig. 3, wherein its forward end is rearward of the inlet port 27, forward toward the right-hand valved end of the cylinder through a pressure stroke to block the inlet port and successively to force out individual charges through the outlet ports as the lateral plunger port 35 passes the outlet ports, assuming that valve 25 remains closed.

More particularly, the cylinder 5 comprises an elongate cylinder block having a main body portion 39 of hexagonal cross section, thereby having six flat sides, and a cylindrical forward end portion 41. The cylinder has a longitudinal bore 43 for the plunger 7 with a counterbore 45 at its rearward end. The plunger extends out of the rearward end of the cylinder through a gland nut 47 threaded in the counterbore 45 through an opening in member 11 and one side of bracket 9. The nut 47 holds in place packing 49. The forward end portion 41 of the cylinder extends through an opening in the other side of the bracket 9. The inlet port 27 leads laterally into the bore 43 from one of the flat sides of the hexagonal main body 39 adjacent the forward end of the body. To this inlet is connected a lubricant supply line (not shown) leading from a source of lubricant, for example, a reservoir of oil with gravity feed to the injector.

The plunger 7 has a close sliding fit in the bore 43. The lateral port 35 in the plunger is formed as an annular peripheral groove with radial openings 51 between the groove and the passage 33 in the plunger. The passage 33 is formed by boring the plunger and then counter-boring to form a valve chamber 53 with a shoulder 55 at its inner end. The check valve 37 consists of a one-piece molded body of rubber or the like, preferably an oil and grease resistant synthetic rubber such as a butadiene co-polymer with acrylonitrile, sold under the trade name Hycar. The check valve is the same as that shown in the aforesaid copending application Serial No. 255,863. It will suffice to state here that the valve has a flat base in the form of a disk with a nipple projecting from one face of the base, and with a conical opening into the nipple, the latter being transversely slit where it joins the base over part of its periphery. The base fits in chamber 53, with the nipple extending into the passage 33, being held in chamber 53 against the shoulder 55 by a washer 57, in turn held on the end of the plunger by a peened-over flange 59.

The successive outlet ports 29 are successively angularly offset. As shown, there are three outlet ports 29 in each of four sides of the hexagonal main body 39 of the cylinder, making twelve outlet ports in all. It will be understood that the injector may have any suitable number of outlet ports. Each outlet port is counterbored and tapped at its outer end to receive a fitting 61 (see Figs. 1 and 2) for connection of a lubricant line (not shown) for delivering lubricant to a bearing.

When the plunger is in the Fig. 3 charging position, lubricant flows from the inlet port 27 directly into the space in the cylinder forward of the plunger 7. The lateral plunger port or groove 35 is blocked. The relation of the longitudinal spacing of the successive outlet ports 29 and of the last outlet port and the inlet port 27 to the width of the groove 35 is such that as the plunger is moved from its charging position to the right through a pressure stroke, the groove 35 comes into communication with the first outlet port 29 of the series (the rearmost outlet port) as the forward end of the plunger blocks off the inlet port 27, and then comes into communication with each successive outlet port as it passes out of communication with the preceding outlet port. This is accomplished by making the intervals between the successive outlet ports equal to the width of the groove 35. By "interval" is meant the distance in the longitudinal direction from the trailing edge of any port (its right edge nearest the right end of the cylinder) to the leading edge (the left edge farthest from the right end of the cylinder) of the next successive port. The distance from the forward end 7 of the plunger to the right edge of the groove 35 is made equal to the distance from the right edge of the inlet port 27 to the left edge of the first outlet port 29 so that the groove 35 comes into communication with the first outlet port as the plunger reaches a position where it blocks off the inlet port 27.

When the plunger is driven to the right from its charging position illustrated in Fig. 3, lubricant is displaced from within the space in the cylinder forward of the plunger outward through the inlet port 27 until the plunger reaches a position wherein it blocks off the inlet port and wherein the right edge of the groove 35 first encounters the left edge of the first of the outlet ports 29. Then, as the groove passes by the outlet port, the check valve 37 opens (assuming that valve 25 remains closed) and a charge of lubricant is forced out from the cylinder through the passage 33, the radial ports 51, the groove 35 and the first outlet port in an amount determined by the displacement of the plunger as it moves through the complete distance over which the groove is open to the port.

As the plunger continues its pressure stroke, the right edge of the groove 35 next encounters the left edge of the next of the outlet ports 29, as the left edge of the groove is cut off from the preceding outlet port. Then, as the groove passes by the next outlet port, and assuming that valve 25 remains closed, a charge of lubricant is forced out of the cylinder through this outlet port in amount the same as was discharged through the preceding port. This action is repeated as the groove 35 passes by the remaining outlet ports, again assuming a closed condition of valve 25. Thus, as the plunger is driven through a pressure stroke from its charging position illustrated in Fig. 3, equal charges are forced out of the cylinder successively through the outlet ports one after another, as long as valve 25 is closed. Upon return of the plunger to charging position by the lever 3, the cylinder is recharged with lubricant for the next cycle of operation.

The by-pass or vent valve 25 comprises a valve body 63 threaded in the forward end portion 41 of the cylinder 5. The valve body has an axial bore 65 toward its rearward end and an axial counterbore 67 toward its forward end. A valve plunger 69 is sealingly slidable in the bore 65 and has an extension 71 which reaches into the counterbore. The plunger 69 has an axial passage 73 leading from its rearward end to a lateral plunger port 75. The valve body has a lateral outlet port 77 which may be connected by a lubricant line (not shown) to the lubricant reservoir which supplies the injectors. The plunger 69 is biased rearward to the retracted position shown in Fig. 3 wherein port 75 is rearward of the lateral port 77 by a coil compression spring 79 surrounding extension 71 in the counterbore 67 and reacting from a cap 81 threaded on the forward end of the valve body against a collar 83 on the plunger. The retracted position of the plunger is determined by engagement of the collar with the shoulder at the inner end of the counterbore. In the retracted position of the plunger, the extension 71 is fully retracted into the valve body 63.

If any bearing does not need lubricant, the by-pass valve 25 operates to vent the charge that would otherwise be delivered through the respective outlet port 29 to the bearing as follows:

The spring 79 is set by adjusting cap 81 to hold the valve plunger 69 in its retracted closed position for pressures in the forward end of cylinder 5 below a predetermined safe pressure for the seals of the bearings. This pressure is higher than that required to open check valve 37. As the lateral plunger port 35 passes the outlet port 29 for any bearing that does not need lubricant, pressure is developed in the cylinder 5 ahead of the injector plunger 7. This pressure acts on the valve plunger 69 and when it reaches the predetermined pressure required to overcome the bias of spring 79, the valve plunger is moved forward to a position wherein port 75 registers with port 77, thereby venting the cylinder 5 back to the lubricant reservoir. Thus, the charge that would normally be supplied through the said outlet port is returned to the reservoir, and application to the respective bearing of lubricant under excessive pressure is avoided, thereby preventing destruction of the bearing seal. As soon as the lateral injector plunger port reaches the next successive outlet port, the pressure in the cylinder is relieved, and the valve plunger 69 is returned by spring 79 to its retracted position. When the valve plunger is moved forward, the extension 71 projects from the valve body 63 and acts as a tell-tale to indicate absence of delivery of lubricant to the bearing.

It will be observed that by means of the invention, a single vent valve takes care of avoiding development of unduly high pressure in any of the outlets, no matter how many outlets there may be.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. An injector comprising a cylinder, a plunger movable in the cylinder, the cylinder being provided with a lateral inlet port toward one end, this being its forward end, and a series of longitudinally spaced lateral outlet ports between its rearward end and the inlet port, the plunger being provided with a lateral port spaced from its forward end and a longitudinal passage for communication from the space in the cylinder forward of the plunger to said lateral plunger port, the plunger having a rearward charging position wherein its forward end is rearward of the inlet port for flow through the inlet port into the space in the cylinder forward of the plunger, and being movable forward from its charging position to block the inlet port and successively to force out individual charges through the outlet ports as the lateral plunger port passes the outlet ports, a vent valve at the forward end of the cylinder, said vent valve comprising a valve body open at one end to the cylinder and having an outlet, a valve member movable in the valve body, means biasing the valve member to a position wherein it blocks off the vent valve outlet from the cylinder, said valve member being subject to pressure in the cylinder and being movable against the bias to a position for venting the forward end of the cylinder upon the development in the cylinder by the plunger of a predetermined pressure, said vent valve thereby acting to vent the charge that would normally be delivered through any injector outlet port in the event of development of said predetermined pressure in said injector outlet port.

2. An injector comprising a cylinder, a plunger movable in the cylinder, the cylinder being provided with a lateral inlet port toward one end, this being its forward end, and a series of longitudinally spaced lateral outlet ports between its rearward end and the inlet port, the plunger being provided with a lateral port spaced from its forward end and a longitudinal passage for communication from the space in the cylinder forward of the plunger to said lateral plunger port, the plunger having a rearward charging position wherein its forward end is rearward of the inlet port for flow through the inlet port into the space in the cylinder forward of the plunger, and being movable forward from its charging position to block the inlet port and successively to force out individual charges through the outlet ports as the lateral plunger port passes the outlet ports, a vent valve at the forward end of the cylinder, said vent valve comprising a valve body having an axial bore open at its rearward end to the cylinder and a lateral valve outlet from the axial bore, a valve plunger movable in the bore having an axial passage open to the cylinder at the rearward end of the valve plunger, said axial passage terminating in a lateral port in the wall of said valve plunger, and means biasing the valve plunger to a rearward retracted position wherein its lateral port is rearward of the lateral valve outlet, the valve plunger being adapted to move forward against the bias in response to development of said predetermined pressure in the cylinder to a position wherein the valve plunger port registers with the lateral valve outlet.

3. An injector comprising a cylinder, a plunger movable in the cylinder, the cylinder being provided with a lateral inlet port toward one end, this being its forward end, and a series of longitudinally spaced lateral outlet ports between its rearward end and the inlet port, the plunger being provided with a lateral port spaced from its forward end and a longitudinal passage for communication from the space in the cylinder forward of the plunger to said lateral plunger port, the plunger having a rearward charging position wherein its forward end is rearward of the inlet port for flow through the inlet port into the space in the cylinder forward of the plunger, and being movable forward from its charging position to block the inlet port and successively to force out individual charges through the outlet ports as the lateral plunger port passes the outlet ports, a vent valve at the forward end of the cylinder, said vent valve comprising a valve body having a threaded connection at its rearward end with the forward end of the cylinder, said valve body having an axial bore open at its rearward end to the cylinder, said body having an axial counterbore in its forward end and a lateral valve outlet in said body from said axial bore, a valve plunger movable in the axial bore having an axial passage open to the cylinder at the rearward end of the valve plunger leading to a lateral port in the valve plunger, the plunger having an extension reaching into the counterbore, the extension having a collar, a cap threaded on the forward end of the valve body, and a coil compression spring surrounding the extension in the counterbore reacting from the cap against the collar to bias the valve plunger to a rearward retracted position wherein its lateral port is rearward of the lateral valve outlet, the valve plunger being adapted to move forward against the bias of the spring in response to development of said predetermined pressure in the cylinder to a position wherein the valve plunger port registers with the lateral valve outlet, the extension thereupon projecting through an opening in the cap to act as a tell-tale.

References Cited in the file of this patent

UNITED STATES PATENTS

| | | |
|---|---|---|
| 976,917 | Richards | Nov. 27, 1910 |
| 1,974,851 | Hurst | Sept. 25, 7934 |
| 2,140,956 | Hall | Dec. 20, 1938 |

FOREIGN PATENTS

| | | |
|---|---|---|
| 259,660 | Italy | July 21, 1928 |